US007350845B1

(12) United States Patent
Duffy

(10) Patent No.: US 7,350,845 B1
(45) Date of Patent: Apr. 1, 2008

(54) MODULAR DECK LID HINGE WITH COIL SPRINGS

(75) Inventor: Michael J. Duffy, Midland (CA)

(73) Assignee: M & C Corporation, Sterling Heights, MI (US)

(*) Notice: Subject to any disclaimer, the term of this patent is extended or adjusted under 35 U.S.C. 154(b) by 0 days.

(21) Appl. No.: 11/539,689

(22) Filed: Oct. 9, 2006

(51) Int. Cl.
*B62D 25/12* (2006.01)

(52) U.S. Cl. .................... 296/76; 296/146.11; 16/296; 16/298

(58) Field of Classification Search .................. 296/76, 296/146.11; 16/296, 298, 295, 306, 308; 49/386
See application file for complete search history.

(56) References Cited

U.S. PATENT DOCUMENTS 2,124,893 A * 7/1938 Peppas ....................... 297/333
2,272,230 A 2/1942 Voorhees
2,308,759 A 1/1943 Joachim
2,547,550 A 4/1951 Whitmore
2,612,651 A 10/1952 Roethel
2,626,421 A * 1/1953 Lyons ......................... 16/300
2,703,430 A 3/1955 Thomas et al.
3,024,488 A * 3/1962 Germann ..................... 16/306
3,810,275 A * 5/1974 Smith .......................... 16/298
3,937,489 A * 2/1976 Hawes et al. ............... 280/204
4,580,315 A * 4/1986 Beckwith ..................... 16/308
5,243,738 A 9/1993 Kiefer
5,465,862 A * 11/1995 Devlin ....................... 220/830
6,618,904 B1 * 9/2003 Nagy .......................... 16/370
6,779,234 B1 * 8/2004 Lu et al. ....................... 16/340
6,867,962 B2 * 3/2005 Cho et al. ................... 361/681
6,929,279 B2 8/2005 Boden
2005/0172453 A1 * 8/2005 Duffy .......................... 16/307
2006/0225247 A1 * 10/2006 Duffy .......................... 16/307
2006/0230578 A1 * 10/2006 Renke et al. ................ 16/289

* cited by examiner

*Primary Examiner*—Dennis H. Pedder
*Assistant Examiner*—Mike Hernandez
(74) *Attorney, Agent, or Firm*—Brooks Kushman P.C.

(57) ABSTRACT

A vehicle body decklid hinge includes at least one hinge set carried by a bracket that retains a pivot pin and a retainer bar in a cantilevered manner. The pivot pin supports a lever, such as a gooseneck strap, that will be coupled to the hood, while the bracket includes a mount that will be carried by peripheral body structure around the decklid opening. The retainer bar carries a helically wound spring that secures one end of the spring for resistance to rotation about the axis of the bar. The other end of the spring engages an adjustor that variably urges the lever to pivot toward the open position. The method and apparatus reduce specificity of components and improve adaptably to various models and styles by reducing adjustments to tension variability in adjusting the biasing force applied to the decklid strap.

11 Claims, 4 Drawing Sheets

MODULAR DECK LID HINGE WITH COIL SPRINGS

BACKGROUND OF THE INVENTION

1. Field of the Invention

A modular decklid hinge with a helically coiled spring forms a hinge mechanism for a vehicle body decklid throughout a wide variety of vehicle styles and models without substantial modifications to the multiple components of the hinge mechanism by relying upon adjustments to the spring tension applied to the pivot lever carrying the decklid.

2. Background Art

During assembly plant production of motor vehicles, a rear decklid (trunk) hinge system is installed in the vehicle in a number of ways. One type of hinge system has a pair of single pivot straps attached between the rear shelf and the decklid. A pivot axis extends through the pair of straps for displacing the decklid secured to the straps by a power source opening the decklid. The power source is provided by a pair of cross-car mounted torsions springs, which are pre-bent steel wires that provide torque between the vehicle body and the decklid. Installation of the hinge pair and torque rod pair is labor-intensive, since the hinges must be installed to connect the decklid to the vehicle's shelf panel, after which the torque rods are installed into the hinge system. Also, because of the limited and awkward access into the rear compartment, installation of torque rods is difficult and can cause injury during their prewinding onto the torque rod attachments of the hinge.

Because each vehicle model is different in body styling and internal structure, the above described system may not be universally selected as it may obstruct useful space or not fit other models without substantial changes to multiple parts of the hinge. A hinge system may be designed, tooled and manufactured specifically for each vehicle model because the components themselves, such as the straps, torsion spring, and body (rear shelf panel) attachment, must be specifically shaped or positioned for each model configuration. Previous attempts to standardize hinge components among a selected variety of different vehicles have not been successful in universally adapting previously produced units and have produced modest savings only.

A previous attempt to provide modularity involved a four bar linkage combined with a gas strut to eliminate installation of torsion springs under the shelf panel. A pair of four bar linkages attached between the gutter and decklid are powered by a pair of charged nitrogen springs to open the decklid. However, such components as the nitrogen charged springs are complicated to fabricate, assemble and install. Moreover, they obstruct access to the compartment from the sides of the vehicle.

Another design includes a single pivot with a four bar linkage and integral coil spring assembled in a housing. This hinge uses a helical coil spring for biasing a four bar linkage toward an open position, but these components and the housing must also be tailored to each vehicle environment and each vehicle's decklid performance specifications. As a result, none of the known production rear decklid hinges provide useful standardization across a variety of many styled vehicle designs.

SUMMARY OF THE INVENTION

The invention allows installation of a hinge and power source into the vehicle at a production assembly plant, without the need for prewinding a torsion spring by the installer. In general, the installation of an integral hinge/power source provides commonality among many different vehicle environments, saving money on tooling and assembly, while reducing redesign of components for tailoring the hinge system to each vehicle model and its peripheral support structure of the vehicle body. The invention also may provide a wide variety of decklid performance specifications with a single hinge set design by relying upon a biasing adjustment for adaptability.

One embodiment includes an interacting bracket that is assembled to support many parts such as the biasing coiled spring, the pivot pin and the strap pivotally supported by the pivot pin, and mounts them to the peripheral support structure. The strap must be specifically designed with particular dimensional relationships to define particular relations between the decklid and the body opening or peripheral body structure so as to provide non-interfering movement as the decklid is displayed between open and closed positions. However, a large number of the other parts may be standardized for use throughout a variety of body styles as the force differences required to open decklids throughout many models may be primarily accommodated by a biasing adjustor that does not change the overall configuration or packaging geometry of the hinge sets.

BRIEF DESCRIPTION OF THE DRAWINGS

The present invention will be more clearly understood by reference to the following detailed description of a preferred embodiment when read in conjunction with the accompanying drawing, in which like reference characters refer to like parts throughout the views, and in which.

DETAILED DESCRIPTION OF THE PREFERRED EMBODIMENT(S)

Figure 1:
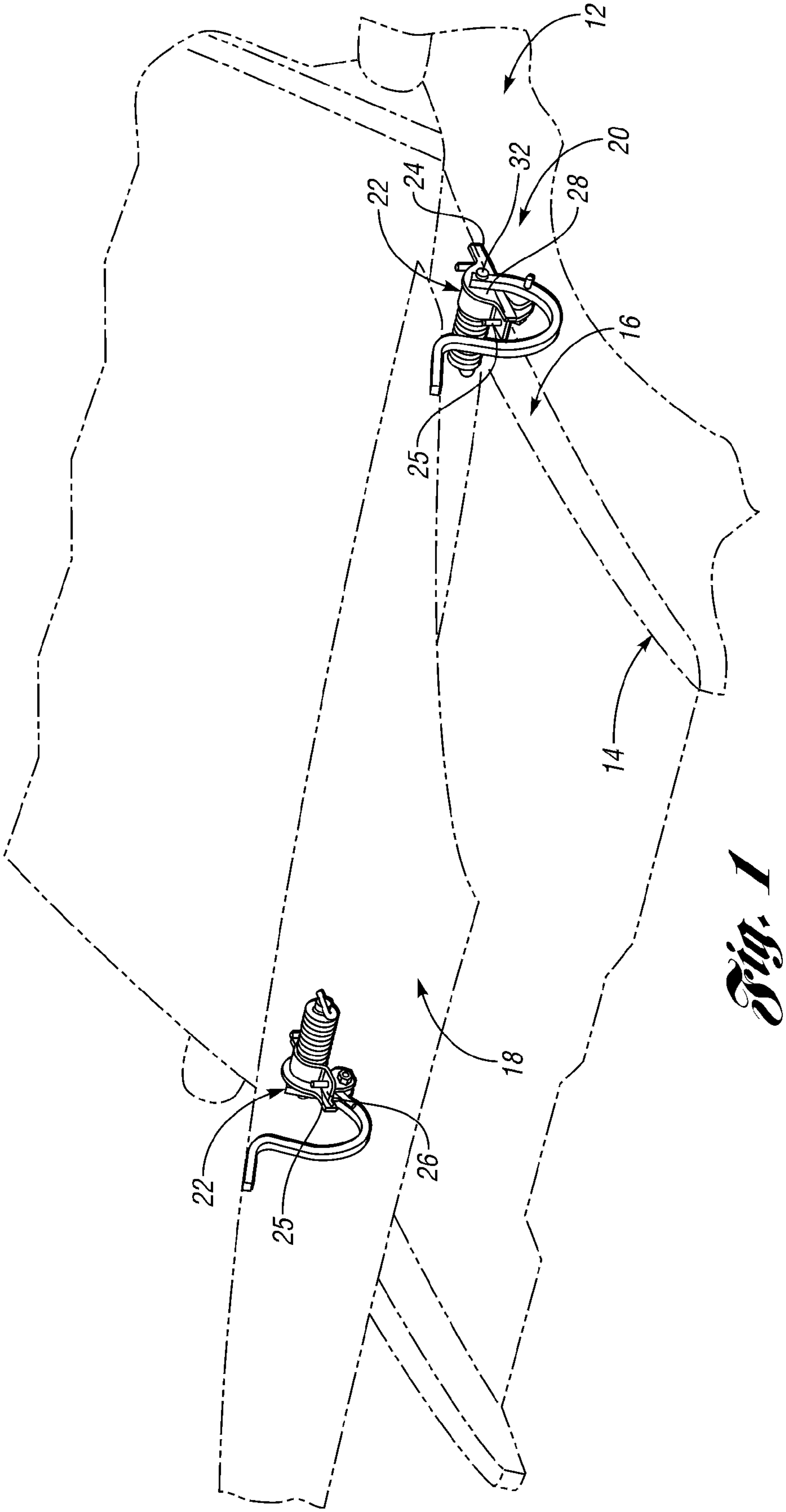
FIG. 1 is a broken perspective view of a motor vehicle with a decklid mounted to a vehicle body structure by a hinge constructed according to the present invention.

Referring first to FIG. 1, a motor vehicle body 12 is there shown including trunk compartment 14 defined by a peripheral body structure 16. A decklid 18, preferably styled together with the peripheral body structure 16, covers the opening or the trunk compartment 14 in a closed position. The decklid 18 is mounted by a hinge mechanism 20. The hinge mechanism 20 preferably comprises a pair of hinge sets 22, that may be constructed as discussed in greater detail below. While a pair of hinge sets 22 is preferred to balance the application of force from lateral portions of the hood, so that displacement forces are balanced about the pivot axis, variations in the number or types of hinge sets that may be employed to form the hinge mechanism 20. Variations may depend upon the design and styling of the motor vehicle or the type of hood closure panel being used to cover a compartment in a vehicle body. For example, the left hinge set 22 of the pair is preferably a mirror image configuration of the right hinge set 22 in the preferred embodiment, but may also be different from the opposite side hinge set without departing from the present invention.

Figure 2:
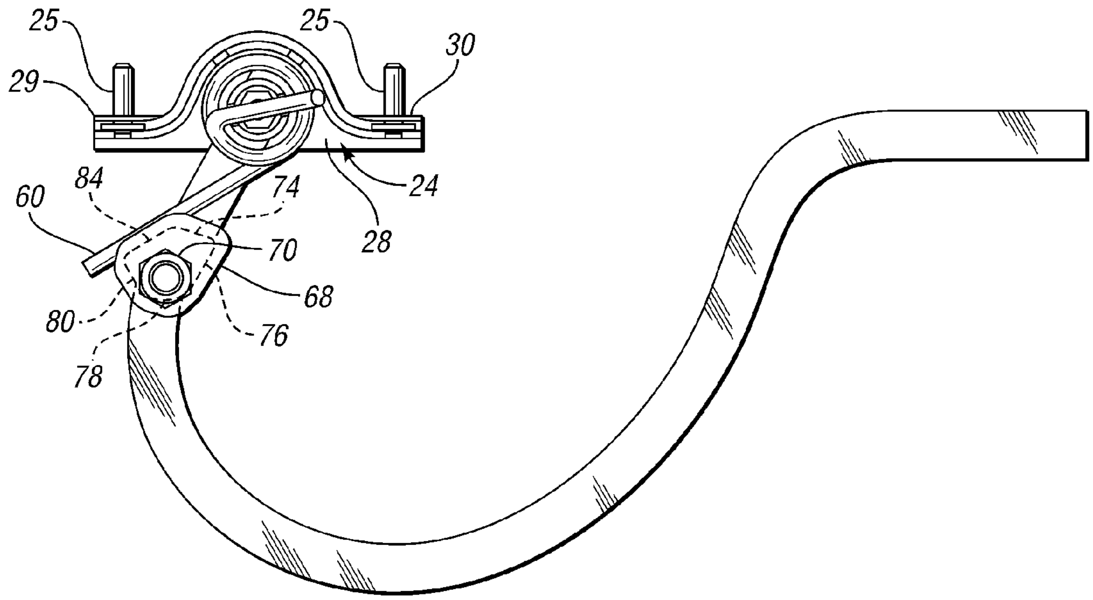
FIG. 2 is an enlarged, side, elevational view of a hinge set assembly shown in FIG. 1.
Figure 6:
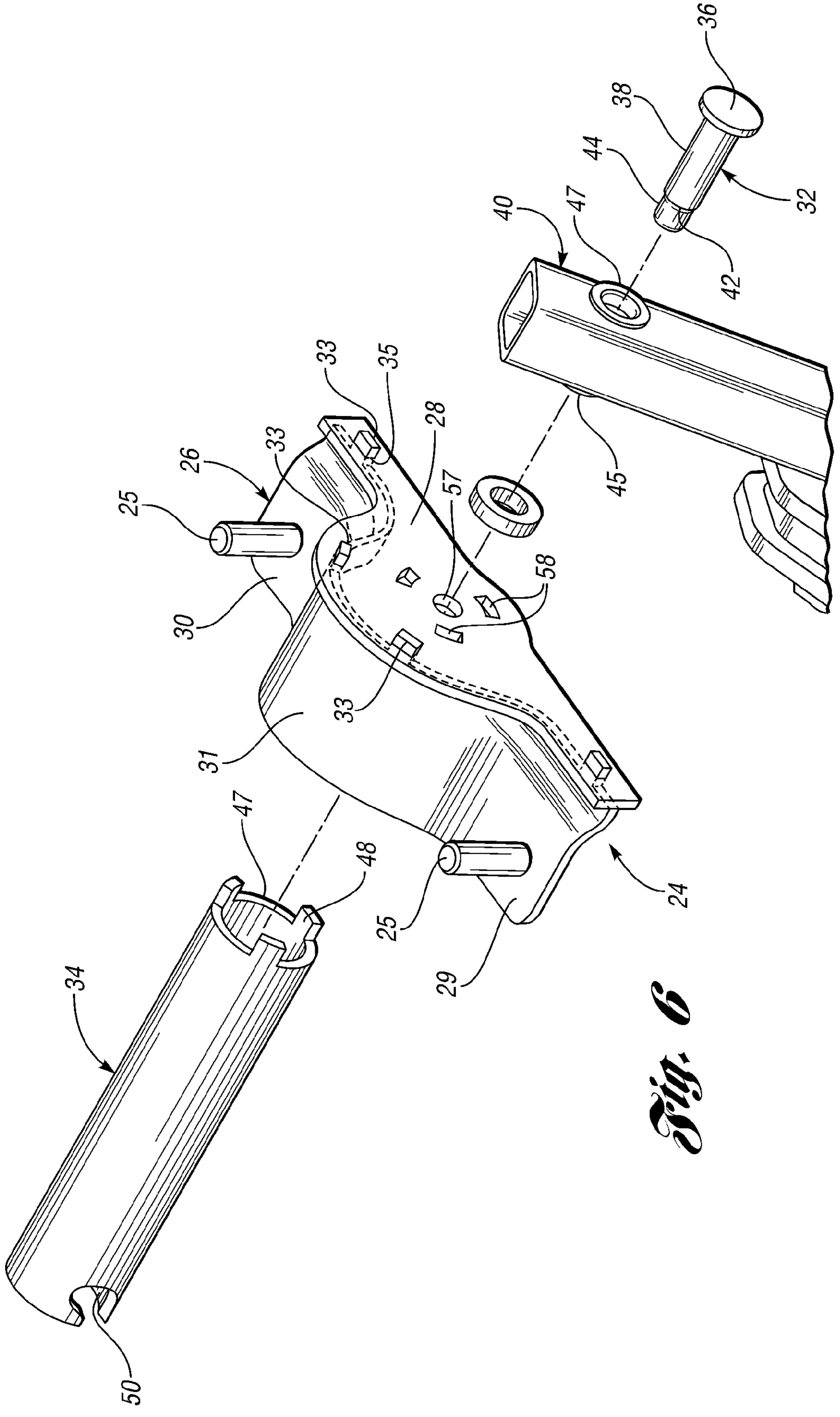
FIG. 6 is an enlarged fragmentary exploded view of a portion of the assembly in FIGS. 1-5.

In the preferred embodiment, each hinge set 22 includes a support bracket 24 having a mount 26 (FIG. 6) for securing the hinge set to the peripheral body structure 16. In the preferred embodiment, the mount 26 comprises separated lands 29 and 30 (FIG. 2) formed to engage and be fastened securely to the peripheral body structure 16 (FIG. 1). For example, a stamping 31 may be configured to adjoin or be formed with a wall 28 of the bracket 24 (FIG. 6). The stamping 31 then is adapted to mate with surface portions of the peripheral body structure 16 and be retained, for example, by fasteners 25. In the illustrated embodiment, the lands include openings adapted to receive fasteners such as bolts 25 that are received through openings in the mount 26 of bracket 24 and aligned openings in the mating portions of the peripheral body structure 16. The stamping 31 and wall may be joined by rivets formed by protrusions 33 of the stamping 31 through openings 35 in the wall 28. Other structural changes to the mount may be made without departing from the invention.

Figure 3:
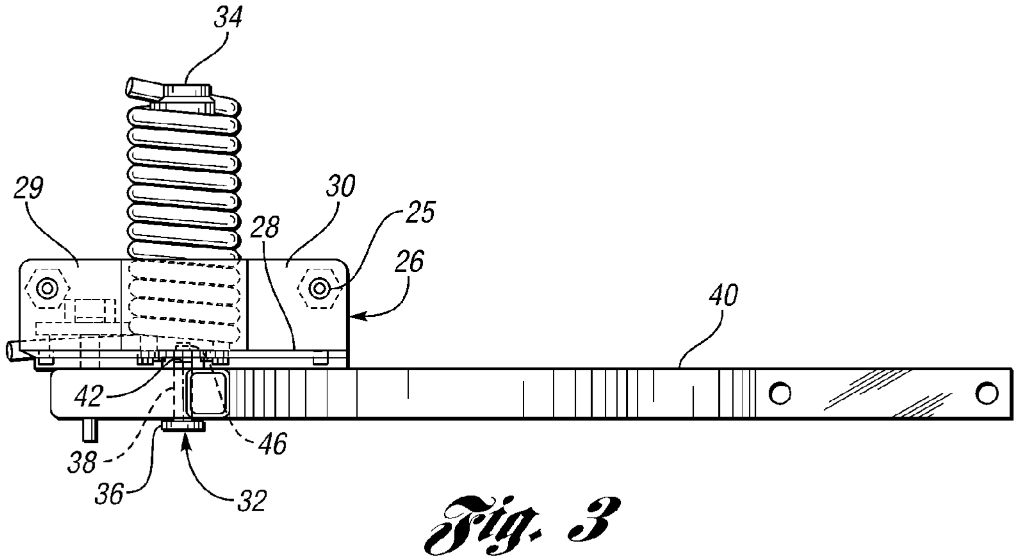
FIG. 3 is an enlarged, fragmentary top view of the hinge set assembly shown in FIGS. 1 and 2.

In addition, the bracket 24 carries a pivot pin 32 (FIG. 3) in a cantilevered protrusion from one surface of the support wall 28 of the bracket 24. Similarly, the support wall 28 of bracket 24 carries a retainer bar 34 (FIG. 3) cantilevered to extend outwardly from the opposite surface of the wall 28. Preferably, the pivot pin 32 and the retainer bar 34 are positioned coaxially to reduce connections and size, but extend from opposite faces of wall 28 in an embodiment where the mount 26 may be aligned so that surfaces of the peripheral body structure 16 do not obstruct the areas adjacent opposite sides of the wall 28. Structural changes to the attachment of the pivot pin or the retainer bar may be made without departing from the invention.

In the illustrated embodiment, a pivot pin 32 may include an enlarged head 36, and a shank 38 (FIG. 6) extending through the aligned openings in a lever arm 40. The shank may be retained in bushings 45 and 47 carried in appropriately sized openings in walls of the lever 40 to permit the lever 40 to pivot about the axis of a pivot pin 32. The pivot pin 32 of the preferred embodiment includes a shank 38 (FIG. 6) that may terminate in a shoulder 42 (FIG. 6), from which the terminal end portion 44 of the shank extends. The end 44 extends through an opening 57 in the wall 28. The shoulder 42 engages a surface of the wall 28 and a protruding portion of the end 44 may then be peened or otherwise retained, as shown at 46 in FIG. 3, against the opposite side or surface of the wall 28.

Similarly, the retainer bar 34 may be retained at one end against a surface of wall 28. For example, the bar 34 may be formed by a hollow tube that lowers the weight but provides torsional stiffness. In a preferred embodiment, the tube likewise includes at least one shoulder 47 (FIG. 6) that rests against a surface of the wall 28, while providing at least one protrusion 48 that extends through an aperture 58 in the wall 28 and is peened or otherwise retained against the opposite side surface of the wall 28. A plurality of such protrusions and openings may be employed.

Figure 4:
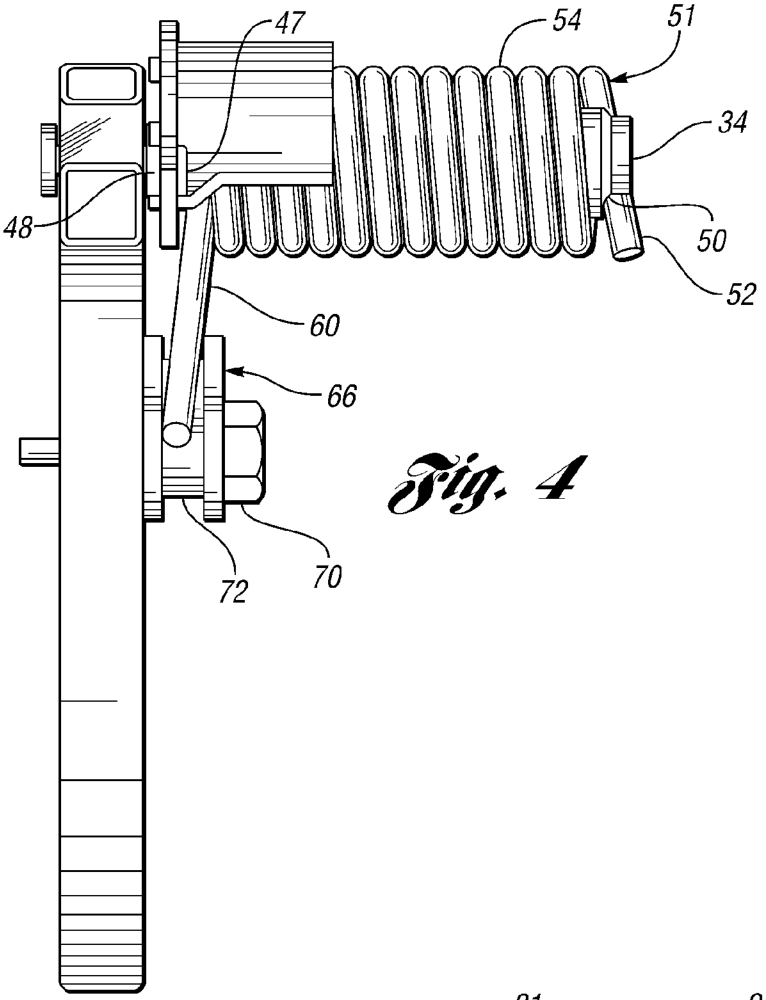
FIG. 4 is an enlarged, fragmentary, end view of the hinge set assembly of FIGS. 1-3.
Figure 5:
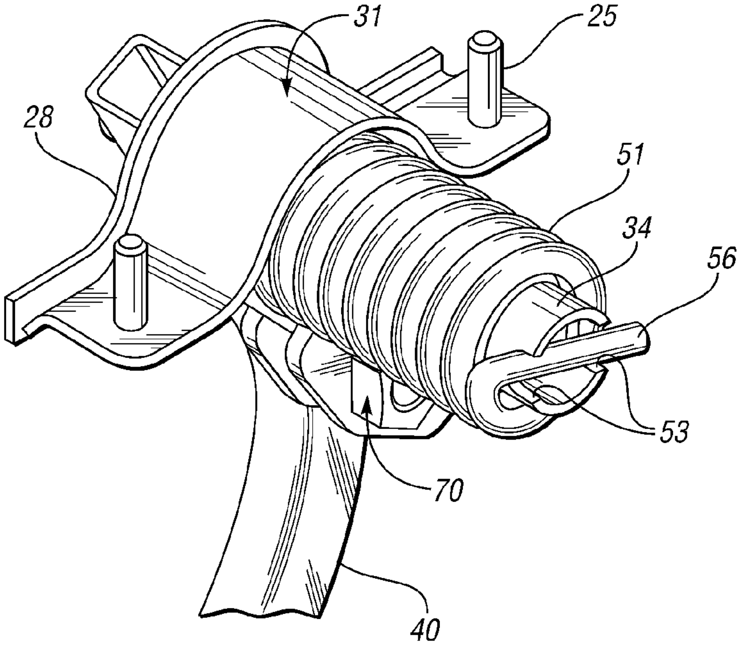
FIG. 5 is an enlarged, fragmentary perspective view of the hinge assembly shown in FIGS. 1-4.

The retainer bar 34 includes a recess 50 (FIG. 4) that receives a terminal end portion of a spring strand 52. The strand 52 is helically coiled at a coil portion 54 (FIG. 4) and the coiled portion 54 is received over the retainer bar 34. In the preferred embodiment, the recess 50 is in the form of a pair of recesses 53 (FIG. 5) or bores on diametrically opposed tube walls, forming the bar 34. However, an open recess 50 could also be employed so long as a strand end 56 may be received for fixed relative rotation with the retainer bar 34 so as to lock the coiled spring's strand end 56 to the retainer bar 34. A strand end portion 60 (FIG. 4) extends from the other end of the coil portion 54.

In a preferred embodiment, the lever 40 comprises a tubular member having walls that retain the bushings carrying the pivot pin 32 pivotally supporting the lever 40. Preferably, the lever 40 has a gooseneck shape, often referred to as a gooseneck strap, to avoid interference between the hood 18 and the peripheral body structure 16 in the displacement path between the open and closed positions of the hood 18. The shape or structure of the strap may change without departing from the present invention.

In a first hinge strap shown in FIG. 1, the hinge strap may be specific to the vehicle, and tailored to its specific environment, or it may fit a wide variety of conventional models. In the illustrated embodiment, the lever 40 is a strap comprised of a bent tube that connects the decklid 18 for movement about the axis of pivot pin 32 with respect to the closed decklid position.

The coiled spring 51 (FIG. 4) is selected depending upon the spring force required as a function of the mass of body panel lid, the center of gravity of the lid and performance specifications of the decklid assembly and hinge linkages. An end 60 of the spring 51 adjacent an end of the coiled portion 54 engages the strap 40 by an adjuster 66. The tailoring of the coil spring to the vehicle may be designed in by varying the number of coils, the wire diameter, and the prewind. The mean coil diameter may be varied in this design. Prewind is varied by diametric placement of the recess 50 or slot relative to the connection at protrusions 48 on the attached end of retainer bar 34 that does not rotate with respect to the bracket. When protrusions and the receiving openings are symmetrical, the recess 50 may be realigned with the bracket during assembly to revise the initial tension applied.

In a preferred embodiment, an adjuster 66 includes a cam body 68 with a plurality of engagement surfaces. In the illustrated embodiment, the cam body is mounted for selective rotation on the strap 40 to engage circumferentially spaced surfaces 74-84 (FIG. 2) that displace the strand end 60 and adjust the torque applied to the strap 40. Preferably, when the cam body 68 is mounted for rotation, the surfaces 74-84 are recessed between guide walls as shown at 72 (FIG. 4) to keep the spring end 60 positioned for engagement with the cam surfaces. The cam body 68 (FIG. 2) may include a grip surface 70 for rotating or locking the cam body 68 at a desired position. The gripping surface 70 shown is a hex shape for engagement by a hex head tool, although other shapes or configurations for engagement with tools or manual manipulation may also be employed without departing from the invention. As the illustrated cam body 68 rotates, the distance between the cam axis and the contact surfaces 74-84 that abuts the strand end 60 adjusts the torque applied to the lever 40. Structural changes to the adjuster 66, its mounting and its coupling with the spring may be made without departing from the present invention.

The present invention provides a method and apparatus for standardizing important parts of a vehicle decklid hinge to reduce design, development, fabrication and assembly requirements in a variety of vehicle body styles without compromising performance in each application. One or more parts, for example, a retainer, a pivot pin, and adjustment bracket may be interchangeable throughout a selected set of a variety of vehicles.

Furthermore, embodiments of the invention provide advantages over a known four bar linkage combined with a gas strut hinge assembly. For example, standard dies for two hinge stampings to form the pair of brackets 24 may be fabricated for use in a large variety of vehicles, as compared to four stampings per four bar linkage employed in the previously known hinges for each vehicle style. In addition, the fabrication of a coil spring from a single strand is simpler than a complex, gas strut assembly and provides cost savings, improved durability, improved performance at high and low temperatures, and improved pop-and-hold performance over previously four-bar linkage hinges. The embodiments may also improve adaptability, repair, availability and mechanical simplicity over those known four-bar hinges.

A preferred fabrication integrates a hinge linkage and a coil spring biasing source in each hinge set to provide a one-step installation for each hinge set in the assembly plant. An advantage over previously known hinges with a single-pivot axis combined with a four bar linkage and integral coil spring is that the modularized hinge fits a variety of vehicle environments. Interchange or cross vehicle adaption may require only minor differences, such as the shape of fabricating straps, to integrate environmental-specific straps. Another advantage of this fabrication is that it eliminates the variations of the geometry of four bars and their links, and defines more predictable performance variation for design changes. The preferred assembly also provides less internal friction, lower cost, and fewer components.

The invention also provides an advantage over a single-pivot hinge requiring torque rod installation by improving ease of installation for the installer. The invention may eliminate of torque rods routed cross-car, provide more room for speakers and other accessories, and does not increase potential for rattle against the shelf.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A decklid hinge for displaceably supporting a decklid to and between open and closed positions over an opening defined by peripheral vehicle body structure, comprising at least one hinge set, each hinge set comprising:

a support bracket with a mount for securing said bracket to the peripheral vehicle body structure;

a pivot pin carried cantilevered by said support bracket, at one end of said pivot pin;

a retainer bar carried cantilevered by and fixed against rotation to said support bracket at one end of said retainer bar;

a spring with a helically coiled strand portion, said coiled portion receiving said retainer bar within and said retainer bar retaining a first strand end; and a linkage having a lever pivoted on said pivot pin, wherein said lever includes an adjuster engaging a second strand end for variably biasing said lever toward said open position.

2. The invention as described in claim 1 wherein said retainer bar is tubular.

3. The invention as described in claim 1 wherein said adjuster comprises a cam body with a plurality of engagement surfaces.

4. The invention as described in claim 3 wherein said cam body is rotatably mounted to said lever about an axis of rotation.

5. The invention as described in claim 4 wherein said cam engagement surfaces are radially spaced from said axis of rotation.

6. A method for modularizing a vehicle decklid hinge by installing a pair of hinge sets to a peripheral body structure defining an opening covered by the hood, the method comprising:

mounting a support bracket to said peripheral body structure;

carrying a pivot pin cantilevered on said support bracket;

carrying a retainer bar cantilevered on and fixed against rotation to said support bracket;

biasing a lever pivoted on said pivot pin with a spring including a helically coiled strand with an end that is held by the retainer bar, and adjusting the coupling of a second strand end to said lever for adjusting the biasing force.

7. The invention as described in claim 6 wherein said adjusting comprises rotating a cam mounted to said lever.

8. The invention as described in claim 7 wherein said cam includes a plurality of engagement surfaces, and said adjusting includes engaging said second strand end against selected engagement surfaces.

9. A decklid hinge for displaceably supporting a decklid to and between open and closed positions over an opening defined by peripheral vehicle body structure, comprising at least one hinge set, each hinge set comprising:

a support bracket with a mount for securing said bracket to the peripheral vehicle body structure;

a pivot pin carried cantilevered by said support bracket, at one end of said pivot pin;

a retainer bar carried cantilevered by and fixed against rotation to said support bracket at one end of said retainer bar;

a spring with a helically coiled strand portion, said coiled portion receiving said retainer bar within and said retainer bar retaining a first strand end;

a linkage having a lever pivoted on said pivot pin, wherein said lever includes an adjuster engaging a second strand end for variably biasing said lever toward said open position;

wherein said retainer bar is tubular; and wherein said adjuster comprises a cam body with a plurality of engagement surfaces.

10. The invention as described in claim 9 wherein said cam body is rotatably mounted to said lever about an axis of rotation.

11. The invention as described in claim 10 wherein said cam engagement surfaces are radially spaced from said axis of rotation.

* * * * *